United States Patent
Liu et al.

(10) Patent No.: US 9,547,775 B2
(45) Date of Patent: Jan. 17, 2017

(54) DEVICE AND METHOD FOR DATA PRIVACY MANAGEMENT

(71) Applicant: HON HAI PRECISION INDUSTRY CO., LTD., New Taipei (TW)

(72) Inventors: Young-Way Liu, New Taipei (TW); Chi-Jsung Lee, New Taipei (TW); Ho-I Sun, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 12 days.

(21) Appl. No.: 14/552,091

(22) Filed: Nov. 24, 2014

(65) Prior Publication Data

US 2016/0104007 A1    Apr. 14, 2016

(30) Foreign Application Priority Data

Oct. 8, 2014 (CN) .................. 103134962

(51) Int. Cl.
 G06F 21/00 (2013.01)
 G06F 21/62 (2013.01)
 G06F 21/31 (2013.01)
 G06F 21/60 (2013.01)
 G06F 21/64 (2013.01)

(52) U.S. Cl.
 CPC .......... G06F 21/6245 (2013.01); G06F 21/31 (2013.01); G06F 21/60 (2013.01); G06F 21/64 (2013.01)

(58) Field of Classification Search
 CPC .......... G06F 21/60; G06F 21/62; G06F 21/64; H04L 63/08; H04L 63/083
 See application file for complete search history.

(56) References Cited

U.S. PATENT DOCUMENTS

| 5,948,104 A * | 9/1999 | Gluck ................... G06F 21/564 713/188 |
| 6,452,617 B1 * | 9/2002 | Bates ...................... G06F 3/038 715/744 |
| 7,484,107 B2 * | 1/2009 | Forlenza ................. H04L 9/088 380/260 |
| 8,583,878 B2 | 11/2013 | Nochimowski et al. |

(Continued)

FOREIGN PATENT DOCUMENTS

| TW | 200935908 A | 8/2009 |
| TW | 200937198 A | 9/2009 |
| TW | 201346612 A | 11/2013 |

OTHER PUBLICATIONS

Gabriel Ghinita et al., Privacy-Preserving Matching of Spatial Datasets with Protection against Background Knowledge, 2010, ACM, pp. 3-12.*

(Continued)

*Primary Examiner* — Kari Schmidt
*Assistant Examiner* — Fahimeh Mohammadi
(74) *Attorney, Agent, or Firm* — Zhigang Ma

(57) ABSTRACT

A method for data privacy management is disclosed. The method includes: predefining, at an electronic device, an action for visualizing hidden data, wherein the hidden data is stored in the electronic device; selecting, at the electronic device, at least one data to be hidden; hiding, at the electronic device, the at least one selected data; detecting, at the electronic device, whether the action is being performed; and visualizing, at the electronic device, the hidden data if the action is detected.

2 Claims, 5 Drawing Sheets

(56) References Cited

U.S. PATENT DOCUMENTS

| | | | |
|---|---|---|---|
| 2008/0208932 A1* | 8/2008 | Tsuge | G06F 11/1458 |
| 2009/0193266 A1* | 7/2009 | Gable | G06F 21/805 |
| | | | 713/193 |
| 2009/0222500 A1* | 9/2009 | Chiu | G06F 21/78 |
| 2010/0095082 A1* | 4/2010 | Hull | G06F 17/30138 |
| | | | 711/171 |
| 2011/0047461 A1* | 2/2011 | Bargmann | G06F 3/0481 |
| | | | 715/702 |
| 2011/0119576 A1* | 5/2011 | Aumann | G06F 17/2282 |
| | | | 715/255 |
| 2013/0272523 A1* | 10/2013 | McCorkindale | H04N 1/44 |
| | | | 380/243 |
| 2013/0276146 A1 | 10/2013 | Gilani et al. | |
| 2014/0033140 A1* | 1/2014 | Zeng | G06F 3/0488 |
| | | | 715/863 |
| 2014/0208418 A1* | 7/2014 | Libin | G06F 21/6209 |
| | | | 726/19 |

OTHER PUBLICATIONS

Kyung-Su Kim et al., Histogram-Based Reversible Data Hiding Technique Using Subsampling, 2008, ACM, pp. 69-74.*

Yuto Tobe et al., A Visible Data Hiding Scheme for Printed Color Images, Nov. 4-7, 2012, IEEE, pp. 901-908.*

Sunil Kumar Kopparapu et al., Visualization of Continuous Density Hidden Markov Models, Sep. 14-16, 2011, IEEE, pp. 1-4.*

* cited by examiner

DEVICE AND METHOD FOR DATA PRIVACY MANAGEMENT

FIELD

The subject matter herein generally relates to a method and device for data privacy management interaction.

BACKGROUND

Electronic devices, for example, smart phones, portable PCs, tablet PCs, have been used with increasing popularity worldwide for a variety of personal and business uses. Users often have some personal data stored in the electronic devices and don't want others to see the personal data. However, when the electronic devices are lent to others for temporary use, the others could see the personal data.

BRIEF DESCRIPTION OF THE DRAWINGS

Implementations of the present technology will now be described, by way of example only, with reference to the attached figures.

DETAILED DESCRIPTION

Figure 1:
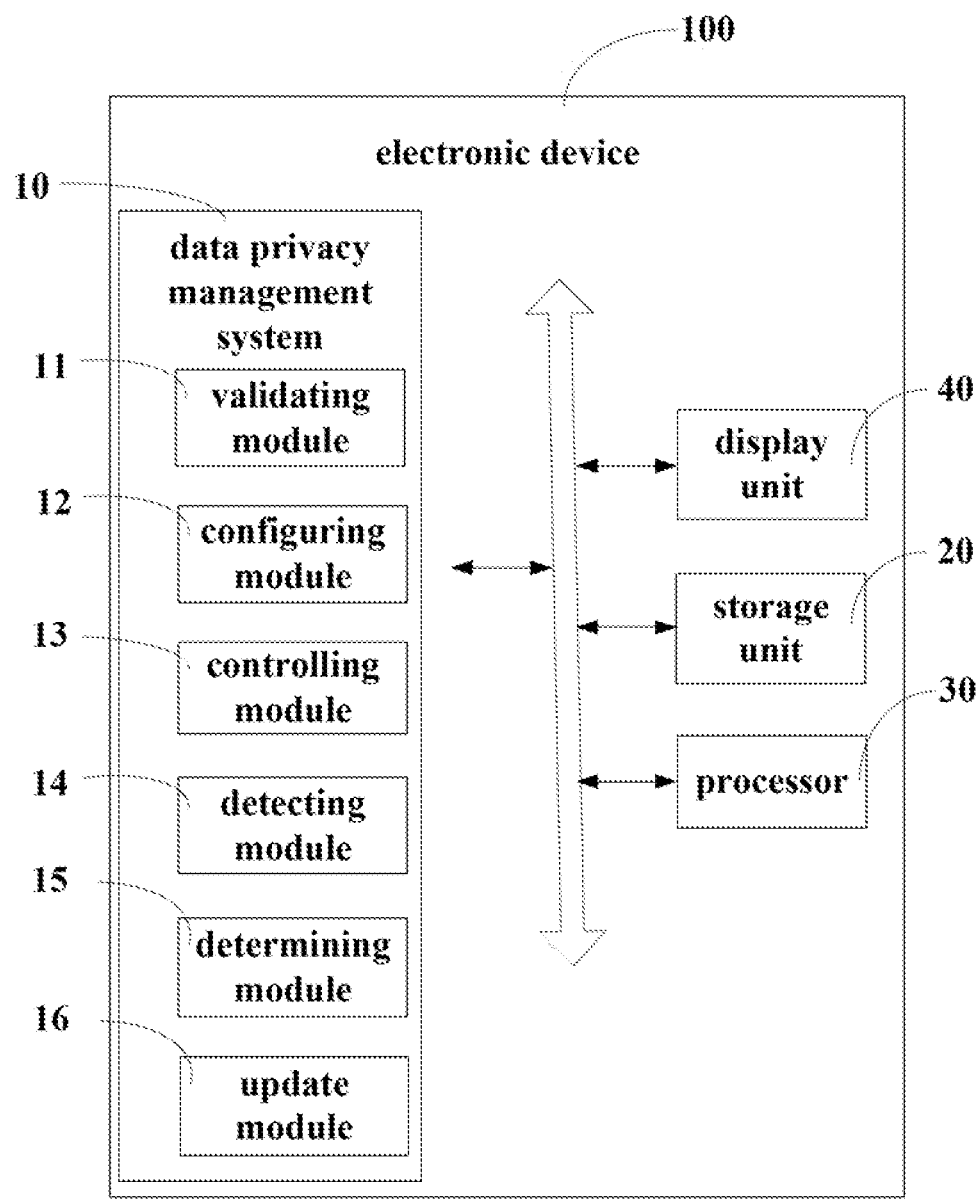
FIG. 1 is a diagrammatic view of an exemplary embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

FIG. 1 illustrates a diagrammatic view of an exemplary embodiment of an electronic device 1. In the example embodiment, the electronic device 1 can be a smart phone, a portable computer, a tablet PC, or other electronic device capable of storing user data. The computing device 1 can include a storage unit 20, a processor 30, and a display unit 40. The storage unit 20 can be a storage system, such as a hard disk, a storage card, or a data storage medium. In at least one embodiment, the storage unit 20 can include two or more storage devices such that one storage device is a memory and the other storage device is a hard drive. Additionally, one or more of the storage devices can be located external relative to the computing device 1. The processor 30 can be a central processing unit (CPU), a microprocessor, or other data processor chip that performs functions of the electronic device 1. The display unit 40 can be configured to display a user interface (UI). The display unit 40 can be a light emitting diode (LED) screen.

A system for data security management 10 can include computerized instructions in the form of one or more programs that are executed by the processor 30 and stored in the storage unit 20. The system 10 can include one or more modules, for example, a configuring module 11, a controlling module 12, a detecting module 13, and a determining module 14. A "module," as used herein, refers to logic embodied in hardware or firmware, or to a collection of software instructions, written in a programming language, such as, JAVA, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The validating module 11 can be configured to validate whether a user is qualified. The configuring module 13 can be configured to predefine an action for hiding/visualizing data. The controlling module 14 can be configured to hide/visualize the data. The detecting module 13 can be configured to whether the predefined action is performed. The determining module 15 can be configured to determine data to be hidden. The update module 16 can be configured to update current memory usage. The updated memory usage can be sum of actual memory usage and memory usage of hidden data.

Figure 4:
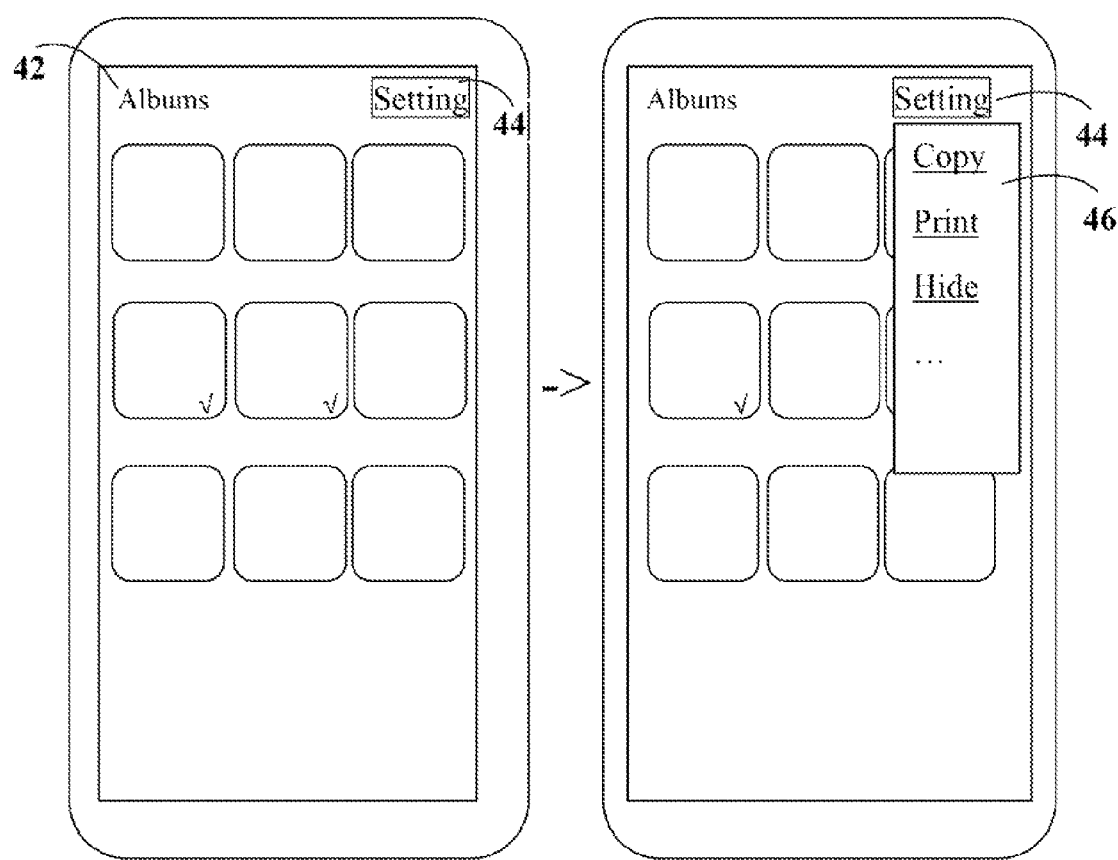
Figure 5:
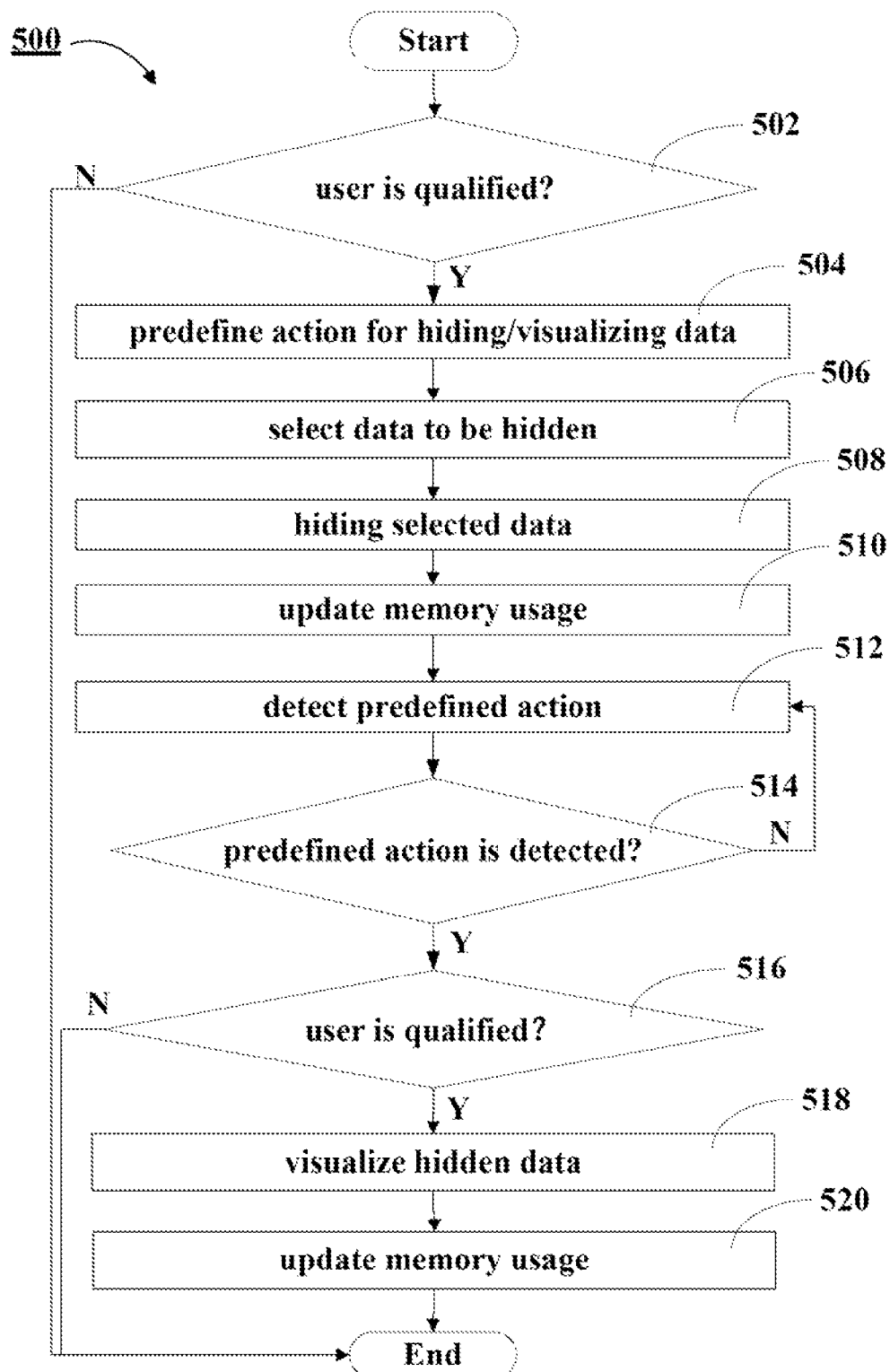
FIG. 5 is a flowchart of an exemplary embodiment of a method for data privacy management.

Referring to FIG. 5, a flowchart is presented in accordance with an example embodiment which is being thus illustrated. The example method 500 is provided by way of example, as there are a variety of ways to carry out the method. The method 500 described below can be carried out using the configurations illustrated in FIGS. 1~4, for example, and various elements of these figures are referenced in explaining example method 500. Each block shown in FIG. 1 represents one or more processes, methods or subroutines, carried out in the exemplary method 500. Additionally, the illustrated order of blocks is by example only and the order of the blocks can change according to the present disclosure. The exemplary method 500 for data privacy management is illustrated in FIG. 5. The exemplary method 500 can be executed at a test device and begin at block 502.

Figure 2:
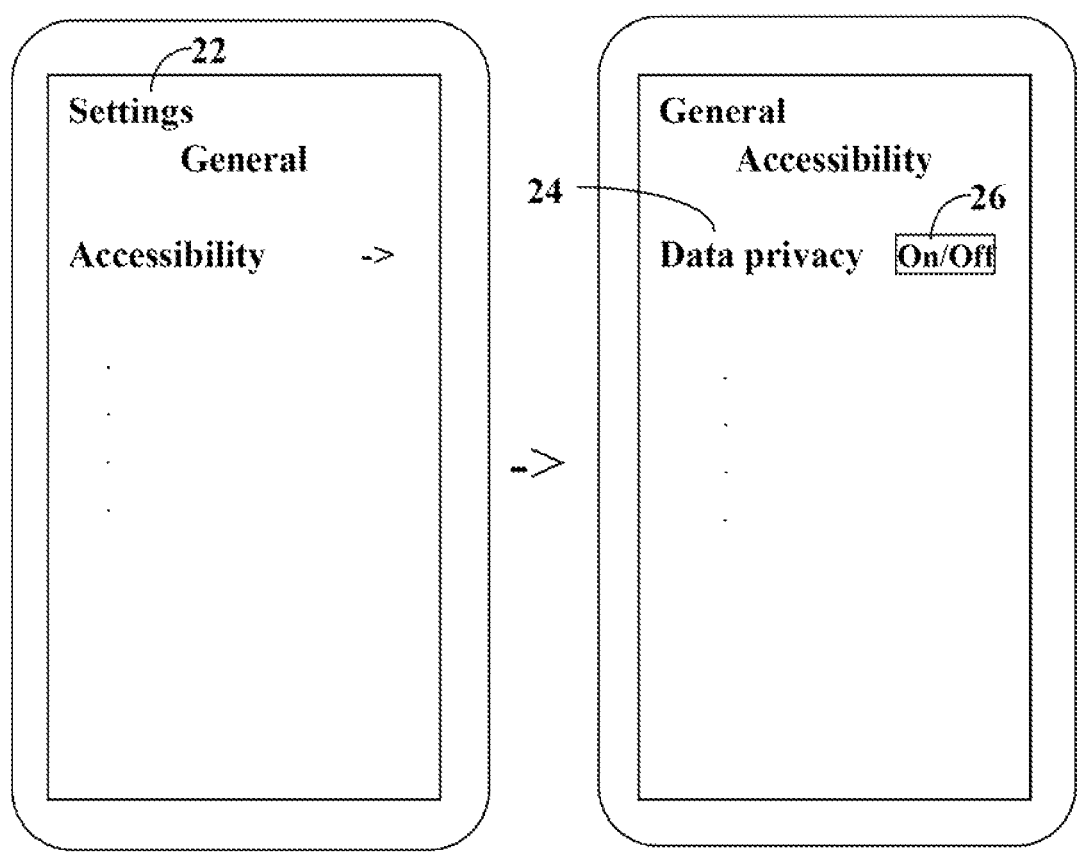
FIGS. 2~4 are diagrammatic views of exemplary embodiments of a user interface of an electronic device.

At block 502, the electronic device validates whether a user is qualified if the user activates "hide" function. Referring to FIG. 2, there can be a "data privacy" option 24 under "Setting" menu 22. If a user presses the "on/off" button 26, the "hide" function can be activated/deactivated. The validation can be performed by password or fingerprint. If the user is qualified, the process goes to block 504, otherwise, the process goes to an end.

Figure 3:
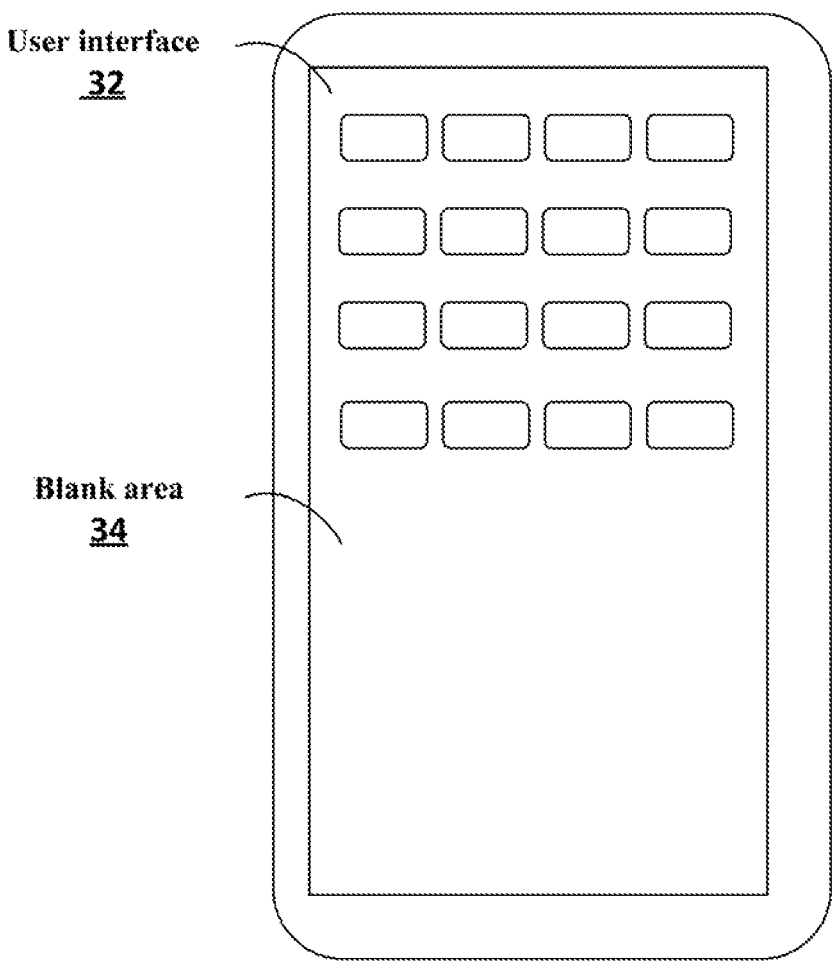

At block 504, the electronic device predefines action for visualizing hidden data. The predefined action can be clicking on a predetermined area of a screen of the electronic device predetermined times, for example 7 times, in predetermined time interval, for example, 1 second. In at least one embodiment, the predefined action can be drawing a predefined curve by moving a finger or a pen on the predetermined area. Referring to FIG. 3, an exemplary user interface (UI) 32 is illustrated, and the predetermined area can be any blank area 34 of the UI 32. The data can include user data or user application.

At block 506, the electronic device selects data to be hidden. For example, if a user wants to hidden some personal photos, the user can first select the photos to be hidden, and then activate "hide" function to hide the selected photos. Referring to FIG. 4, an exemplary embodiment of a UI 42 is illustrated. The UI 42 can provide functions that a user selects photos to be hidden. After photos to be hidden are selected, a user can press "Settings" button 44 to open the pull-down menu 46 and then selects "Hide" option to activate "hide" function. In at least one embodiment, the user can perform the predefined action to activate "hide" function, and then select data to be hidden.

At block 508, the electronic device hides the selected data. After the selected data is hidden, a user cannot find the hidden data in all UIs of the electronic device.

At block 510, the electronic device updates memory usage. The updated memory usage is equal to actual memory usage minus the memory usage of current hidden data.

At block 512, the electronic device detects user action on the screen of the electronic device.

At block 514, the electronic device determines whether the user action is predefined action. If the user action is the predefined action, the process goes to block 516, otherwise, the process goes back to block 512.

At block 516, the electronic device validates whether the user is qualified. The validation in block 516 can be in the same way with that in block 502. If the user is qualified, the process goes to block 518, otherwise, the process goes to the end.

At block 518, the electronic device visualizes the hidden data. In at least one embodiment, the user can select part of the hidden data to be visualized.

At block 520, the electronic device updates memory usage. The updated memory usage is equal to actual memory usage minus the memory usage of current hidden data. If all the hidden data is visualized, the updated memory usage is equal to the actual memory usage. If part of the hidden data is visualized, the updated memory usage is equal to the actual memory usage minus the current hidden data.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for managing privacy data of an electronic device being executed by at least one processor of the electronic device, the method comprising:

validating, at the electronic device, whether the user is qualified before visualizing and/or hiding data;

predefining, at the electronic device, an action for visualizing hidden data, wherein the hidden data is stored in the electronic device;

selecting, at the electronic device, data to be hidden;

hiding, at the electronic device, the selected data;

updating memory usage after hiding the selected data, wherein the updated memory usage is equal to real memory usage minus memory usage of current hidden data;

detecting, at the electronic device, whether the predefined action is being performed to visualize the hidden data, wherein the predefined action is clicking any blank area of a displayed user interface;

visualizing, at the electronic device, the hidden data when the predefined action is detected;

wherein the predefined action is a predetermined number of clicks on a screen of the electronic device within a predetermined time; and updating memory usage after visualizing the hidden data, wherein the updated memory usage is equal to real memory usage.

2. An electronic device, comprising:

a screen for displaying at least one user interface;

a storage unit for storing instructions;

a processor for executing the instructions to perform a method for managing privacy data of the electronic device, the method comprising:

predefining an action for visualizing hidden data, wherein the hidden data is stored in the electronic device;

selecting data to be hidden;

hiding the selected data;

updating memory usage after hiding the selected data, wherein the updated memory usage is equal to real memory usage minus memory usage of current hidden data;

detecting whether the predefined action is being performed to visualize the hidden data, wherein the predefined action is clicking any blank area of a displayed user interface; and visualizing the hidden data when the predefined action is detected;

wherein the processor validates whether the user is qualified before visualizing and/or hiding data;

wherein the predefined action is a predetermined number of clicks on a screen of the electronic device within a predetermined time; and wherein the method further causes the processor to update memory usage after visualizing the hidden data, wherein the updated memory usage is equal to real memory usage.

* * * * *